United States Patent
Balasubramanian et al.

(10) Patent No.: US 11,917,401 B2
(45) Date of Patent: Feb. 27, 2024

(54) DIRECTIONAL SECURE COMMUNICATIONS

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Navid Abedini, Basking Ridge, NJ (US); Junyi Li, Fairless Hills, PA (US); Sourjya Dutta, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/476,718

(22) Filed: Sep. 16, 2021

(65) Prior Publication Data

US 2023/0095651 A1 Mar. 30, 2023

(51) Int. Cl.
*H04W 12/63* (2021.01)
*H04B 7/06* (2006.01)
(Continued)

(52) U.S. Cl.
CPC ...... *H04W 12/0471* (2021.01); *H04B 7/0617* (2013.01); *H04L 9/0872* (2013.01);
(Continued)

(58) Field of Classification Search
CPC . H04W 12/0471; H04W 12/60; H04W 12/63; H04W 12/65; H04W 12/03;
(Continued)

(56) References Cited

U.S. PATENT DOCUMENTS

| 8,625,803 B1 * | 1/2014 | Radhakrishnan ..... H04L 9/0891 380/279 |
| 2016/0013941 A1 * | 1/2016 | Gungor ................. H04L 9/0872 380/44 |

(Continued)

OTHER PUBLICATIONS

Chu Z., et al., "Simultaneous Wireless Information Power Transfer for MISO Secrecy Channel", IEEE Transactions on Vehicular Technology, IEEE, USA, vol. 65, No. 9, Sep. 1, 2016, pp. 6913-6925, XP011623088, ISSN: 0018-9545, DOI: 10.1109/TVT.2015. 2499439, p. 6914, left-hand column, paragraph 2.

Intel Corporation: "Discussion on Potential Enhancement of Positioning Techniques", 3GPP Tsg-Ran WG1 #80bis, R1-151446, 3rd Generation Partnership Project, Mobile Competence Centre, 650, Route Des Lucioles, F-06921 Sophia-Antipolis Cedex, France, vol. Ran WG1, No. Belgrade, Serbia, 20150420-20150424, 5 p. Apr. 19, 2015, XP050934321, section 4.

(Continued)

*Primary Examiner* — Shaqueal D Wade-Wright
(74) *Attorney, Agent, or Firm* — Procopio, Cory, Hargreaves & Savitch

(57) ABSTRACT

Methods, apparatuses, and computer-readable medium for directional security are provided. An example method may include receiving, from a wireless device, a configuration for a set of shared keys. The example method may further include receiving, from a second UE, at least one message or signal including a location of the second UE, the received at least one message or signal being associated with an angle of arrival. The example method may further include configuring a key from the set of shared keys based on at least one of the received configuration, the location of the second UE, the AoA of the received at least one message or signal, or a location of the first UE. The example method may further include generating one or more ranging signals based on the configured key, the one or more ranging signals being directionally secure based on the location of the second UE.

16 Claims, 15 Drawing Sheets

(51) Int. Cl.
  *H04L 9/08* (2006.01)
  *H04L 9/40* (2022.01)
  *H04W 12/0471* (2021.01)
  *H04W 12/60* (2021.01)
  *H04W 12/64* (2021.01)
  *H04W 12/65* (2021.01)

(52) U.S. Cl.
  CPC ......... *H04L 63/0492* (2013.01); *H04W 12/60* (2021.01); *H04W 12/63* (2021.01); *H04W 12/64* (2021.01); *H04W 12/65* (2021.01)

(58) Field of Classification Search
  CPC ... H04W 12/64; H04W 12/04; H04W 12/041; H04W 12/0433; H04W 12/50; H04B 7/0617; H04B 7/0695; H04B 7/088; H04L 9/0872; H04L 63/0492; H04L 63/1475; H04L 63/16; H04L 63/06; H04L 63/061; H04L 9/08; H04L 9/0819; H04L 9/0838
  See application file for complete search history.

(56) References Cited

U.S. PATENT DOCUMENTS

| | | | |
|---|---|---|---|
| 2020/0044840 A1* | 2/2020 | Chang | H04W 12/041 |
| 2021/0051005 A1* | 2/2021 | Kunz | H04W 12/033 |
| 2022/0399994 A1* | 12/2022 | Sierra | H04L 9/3297 |

OTHER PUBLICATIONS

International Search Report and Written Opinion—PCT/US2022/038890—ISA/EPO—dated Jan. 9, 2023.

Jiang L., et al., "Secure Beamforming Design for SWIPT in Cooperative D2D Communications", China Communications, China Institute of Communications, Piscataway, NJ, USA, vol. 14, No. 1, Jan. 1, 2017, pp. 20-33, XP011640130, ISSN: 1673-5447, DOI: 10.1109/CC.2017.7839755, Title and p. 25, paragraph bridging the left and the right column.

OPPO: "Discussion on Sidelink Positioning", 3GPP TSG RAN Rel-18 Workshop, RWS-210048, 3rd Generation Partnership Project, Mobile Competence Centre, 650, Route Des Lucioles, F-06921 Sophia-Antipolis Cedex, France, vol. TSG RAN, No. Electronic Meeting, Jun. 22, 2021-Jul. 2, 2021, Jun. 7, 2021, XP052025612, 4 Pages, slides 2 and 3.

Partial International Search Report—PCT/US2022/038890—ISA/EPO—dated Oct. 25, 2022.

Shu F., et al., "Enhanced Secrecy Rate Maximization for Directional Modulation Networks via IRS", IEEE Transactions on Communications, IEEE Service Center, Piscataway, NJ, USA, vol. 69, No. 12, Sep. 6, 2021, pp. 8388-8401, XP011894251, ISSN: 0090-6778, DOI: 10.1109/TCOMM.2021.3110598, paragraph bridging left-hand column and right-hand column of p. 8391, figure 1.

* cited by examiner

DIRECTIONAL SECURE COMMUNICATIONS

TECHNICAL FIELD

The present disclosure relates generally to communication systems, and more particularly, to wireless communication systems with a reconfigurable intelligent surface (RIS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first user equipment (UE) are provided. The apparatus may include a memory and at least one processor coupled to the memory. The memory and the at least one processor coupled to the memory may be configured to receive, from a wireless device, a configuration for a set of shared keys. The memory and the at least one processor coupled to the memory may be further configured to receive, from a second UE, at least one message or signal including a location of the second UE, the received at least one message or signal being associated with an angle of arrival (AoA). The memory and the at least one processor coupled to the memory may be further configured to configure a key from the set of shared keys based on at least one of the received configuration, the location of the second UE, the AoA of the received at least one message or signal, or a location of the first UE. The memory and the at least one processor coupled to the memory may be further configured to generate one or more ranging signals based on the configured key, the one or more ranging signals being directionally secure based on the location of the second UE.

In another aspect of the disclosure, a method, a computer-readable medium, and an apparatus at a first UE are provided. The apparatus may include a memory and at least one processor coupled to the memory. The memory and the at least one processor coupled to the memory may be configured to perform beam training with a base station based on one or more beam sweeps and one or more RIS settings. The memory and the at least one processor coupled to the memory may be further configured to receive, from the base station, a beam index based on a location of the first UE, a location of a second UE, a location of a third UE, or the beam training. The memory and the at least one processor coupled to the memory may be further configured to communicate, via the RIS with the second UE, based on the beam index, the communication being directionally secure against the location of the third UE.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, to a first UE within a first zone and a second UE within a second zone via broadcasting, a request for a measurement report associated with a set of measurement resources, the request being associated with a communication via a RIS between a third UE within the first zone and a fourth UE within the second zone. The memory and the at least one processor coupled to the memory may be further configured to receive, from the first UE and the second UE, the measurement report based on the request and the set of measurement resources. The memory and the at least one processor coupled to the memory may be further configured to perform beam training with the third UE or the fourth UE based on one or more beam sweeps, one or more RIS settings associated with the RIS, or the measurement report. The memory and the at least one processor coupled to the memory may be further configured to transmit, to the third UE, a beam index based on the beam training. The memory and the at least one processor coupled to the memory may be further configured to adjust the RIS based on the beam training and one RIS setting of the one or more RIS settings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
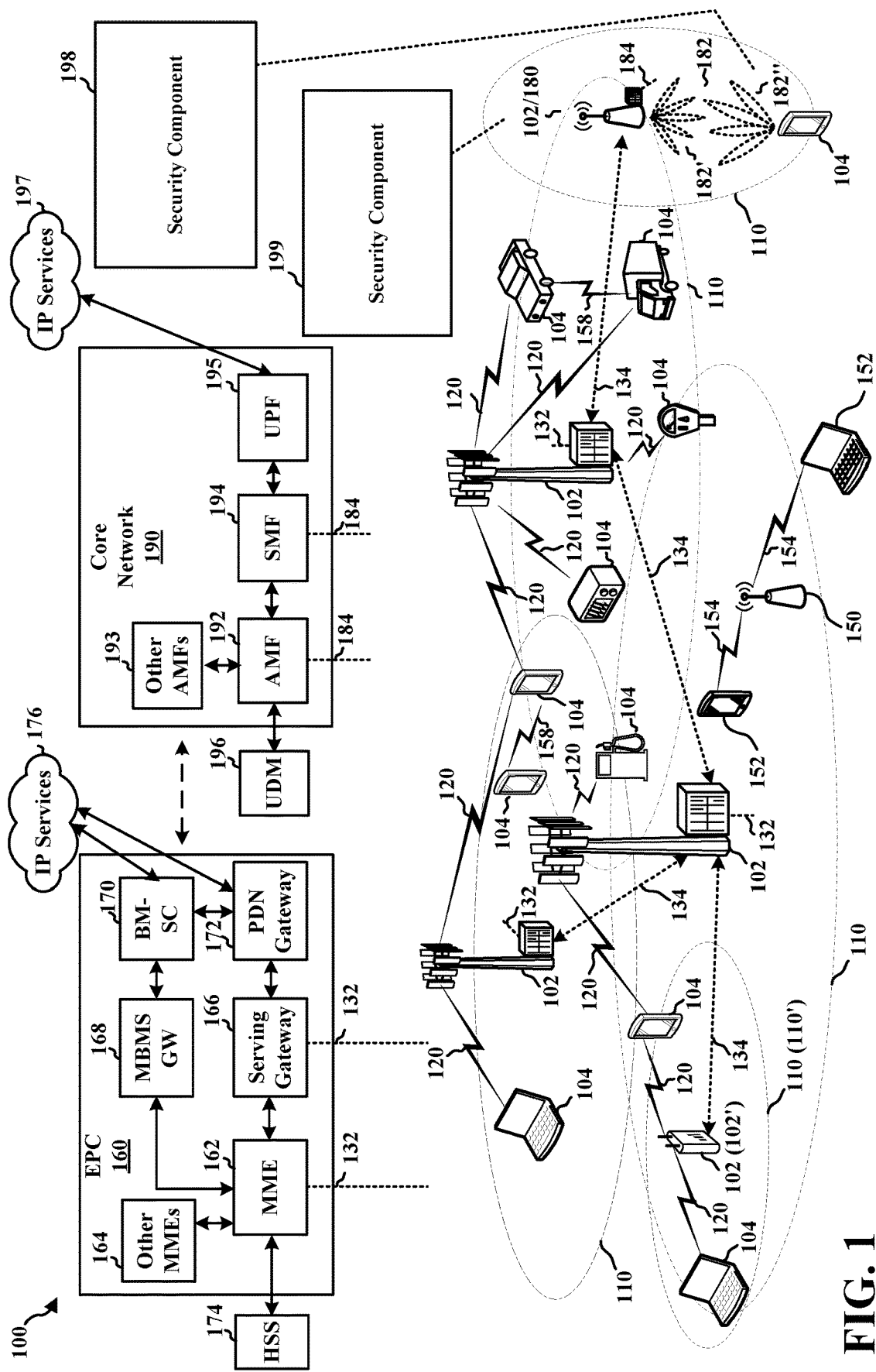
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a security component 198. In some aspects, the security component 198 may be configured to receive, from a wireless device, a configuration for a set of shared keys. In some aspects, the security component 198 may be further configured to receive, from a second UE, at least one message or signal including a location of the second UE, the received at least one message or signal being associated with an AoA. In some aspects, the security component 198 may be further configured to configure a key from the set of shared keys based on at least one of the received configuration, the location of the second UE, the AoA of the received at least one message or signal, or a location of the first UE. In some aspects, the security component 198 may be further configured to generate one or more ranging signals based on the configured key, the one or more ranging signals being directionally secure based on the location of the second UE.

In some aspects, the security component 198 may be configured to perform beam training with a base station based on one or more beam sweeps and one or more RIS settings. In some aspects, the security component 198 may be further configured to receive, from the base station, a beam index based on a location of the first UE, a location of a second UE, a location of a third UE, or the beam training. In some aspects, the security component 198 may be further configured to communicate, via the RIS with the second UE, based on the beam index, the communication being directionally secure against the location of the third UE.

In some aspects, the base station 180 may include a security component 199. In some aspects, the security component 199 may be configured to transmit, to a first UE within a first zone and a second UE within a second zone via broadcasting, a request for a measurement report associated with a set of measurement resources, the request being associated with a communication via a RIS between a third UE within the first zone and a fourth UE within the second zone. In some aspects, the security component 199 may be further configured to receive, from the first UE and the second UE, the measurement report based on the request and the set of measurement resources. In some aspects, the security component 199 may be further configured to perform beam training with the third UE or the fourth UE based on one or more beam sweeps, one or more RIS settings associated with the RIS, or the measurement report. In some aspects, the security component 199 may be further configured to transmit, to the third UE, a beam index based on the beam training. In some aspects, the security component 199 may be further configured to adjust the RIS based on the beam training and one RIS setting of the one or more RIS settings.

Although the following description may be focused on 5G NR, the concepts described herein may be applicable to other similar areas, such as LTE, LTE-A, CDMA, GSM, and other wireless technologies.

Figure 2:
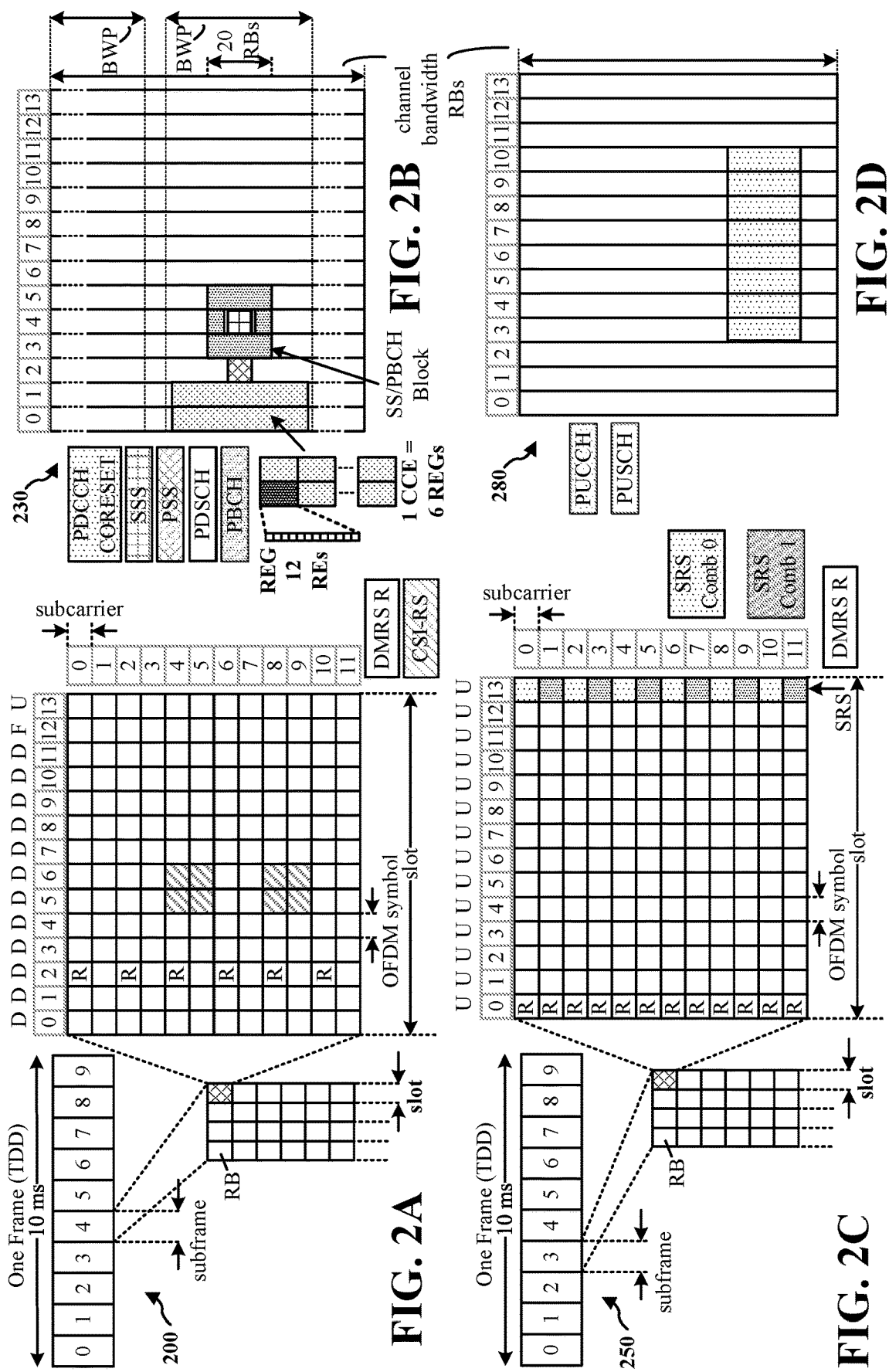
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
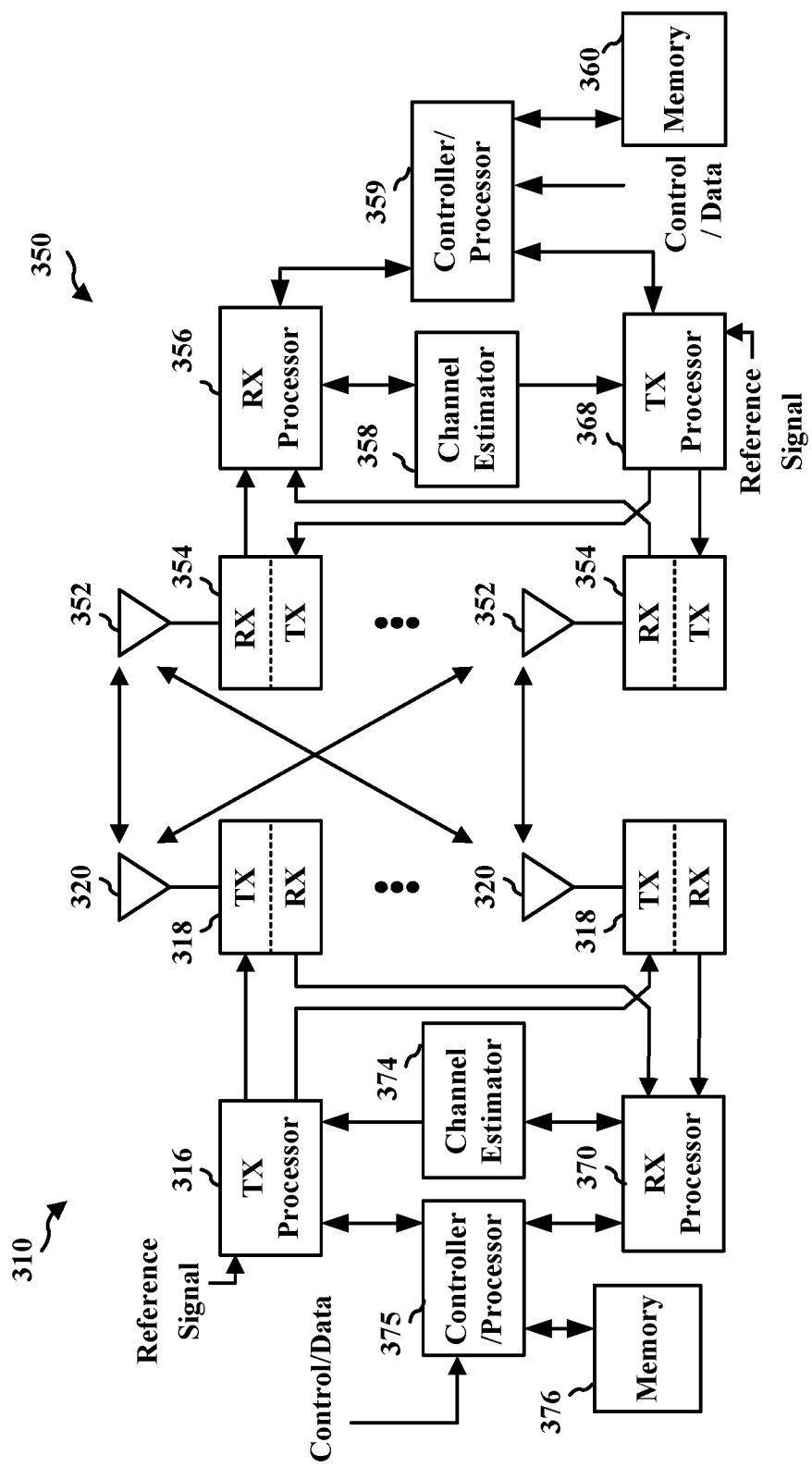
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with security component 198 of FIG. 1.

At least one of the TX processor 316, the RX processor 370, and the controller/processor 375 may be configured to perform aspects in connection with security component 199 of FIG. 1.

With the increase in diverse applications that may be supported in wireless communication, security becomes an increasingly important aspect of wireless communication systems. For example, when a first vehicle UE shares its sensor information with a second vehicle UE, the second vehicle UE may use the sensor information to facilitate vehicle platooning and automated driving. If the second vehicle UE mistrusts sensor information from the first vehicle UE, i.e., the sensor information is not trusted, catastrophic consequences may occur. Therefore, having security so that a vehicle UE can trust another vehicle UE's sensor information may be important for enabling various vehicle-related applications.

Security may be enabled at different levels in the protocol stacks, such as a physical (PHY), medium access control (MAC), or application (APP) level. In some wireless communication systems, upper-layer security (such as APP level security) may be more focused on compared with lower-layer security (such as PHY level security). However, there are applications where lower-layer security may be better suited. For example, for ranging applications where time of arrival of the first path may be correctly determined, lower-layer security such as PHY level security may be important. For some use cases, such as digital car key, which enables autonomously unlocking a car when the key (i.e., user) is nearby may be enabled by highly secure PHY layer communications. For these use cases, PHY level security may not be replaced by APP level security.

As one example, secure communications may be realized by having a common fixed shared key between transmitters and receivers. However, the common fixed shared key may still be under the risk of being eavesdropped (i.e., retrieved without authorization). Some example aspects provided herein provide a more robust and secure method of sharing keys between communication end points. By configuring a set of shared keys and utilizing individual keys based on locations, a potential eavesdropper may not be able to eavesdrop on communications even if the eavesdropper obtained the shared keys. Some other example aspects provided herein may enable directionally secure communications by communicating via a RIS. With the aid of a base station, by adjusting the reception filter on the receiver, transmission filter on a transmitter, and RIS settings, communications between two UEs may be directional secure against a potential eavesdropper in particular directions.

Figure 4:
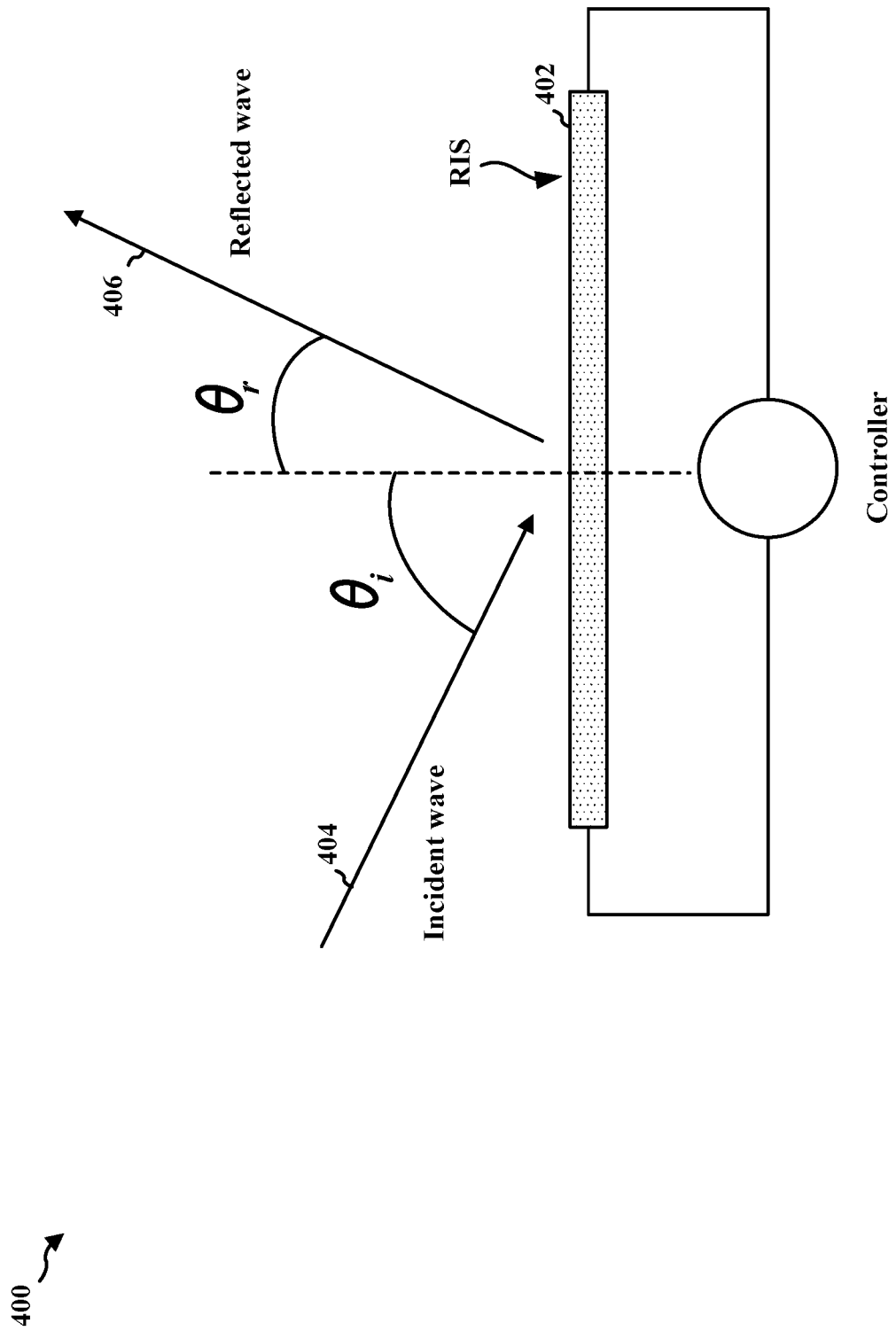
FIG. 4 is a diagram illustrating example RIS and AoA.

A RIS may be a two-dimensional surface of engineered material where the properties are reconfigurable rather than static. For example, the scattering, absorption, reflection, and diffraction properties may be configurable and controlled. RIS may be low-power passive devices without a transceiver that can act as a phased array. RISs may be used to steer an incident wave in the desired direction using a controller. For example, FIG. 4 is a diagram 400 illustrating an example RIS. As illustrated in FIG. 4, the RIS 402 may reflect an incident wave 404 into a reflected wave 406 in a particular direction. The angle at which the incident wave 404 arrives may be an AoA.

Figures 5A, 5B:
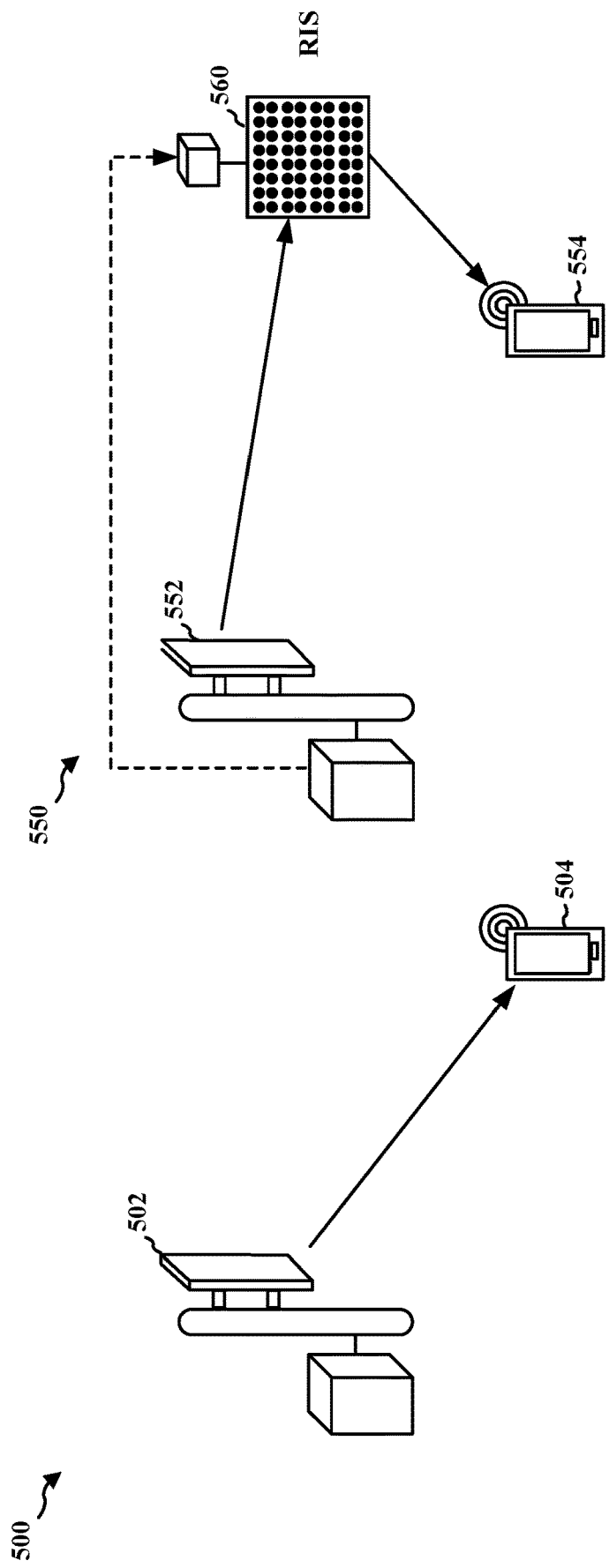
FIGS. 5A and 5B are diagrams illustrating communications with and without a MS.

Additionally, a RIS may be used to change the channel environment. FIGS. 5A and 5B are diagrams 500 and 550 illustrating communications with and without a MS. As illustrated in FIG. 5A, a signal carrying communication between a transmitter 502 and a receiver 504 may be in a direct path between the transmitter 502 and the receiver 504, and the channel condition may be based on the direct path. As illustrated in FIG. a signal carrying communication between a transmitter 552 and a receiver 554 may be based on a reflected path. The transmitter may transmit a signal to the RIS 560, and the RIS 560 may reflect the signal to the receiver 554. The path in which the signal travels may be the reflected path and may be different from the direct path.

Therefore, the signal carrying the communication between transmitter 552 and receiver 554 may experience a different channel condition.

Because a MS may be used to change the channel environment, one can artificially induce a desired channel response by switching on/off or adjusting a number of RISs present in the environment together by adapting the analog beamforming weights of a MS. For example, the communication between the transmitter 552 and the receiver 554 may be adjusted by adapting the RIS settings of MS 560 and adapting the analog beamforming weights of the MS 560. Reception filter of the receiver 554 and transmission filter of the transmitter 552 may be accordingly adjusted as well. While a RIS may help in enhancing communication between two end points, a RIS may also be used for creating interference. The interference may be used for making a signal directionally secure against a potential eavesdropper in certain directions where the interference may be created to be high.

Figure 6B:
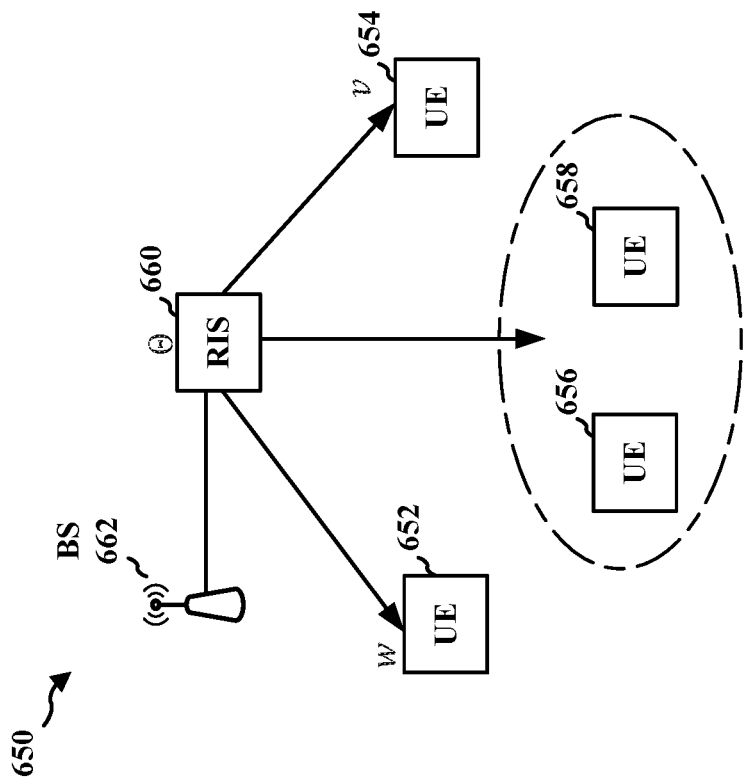
FIGS. 6A and 6B are diagrams illustrating communications between UEs.
Figure 6A:
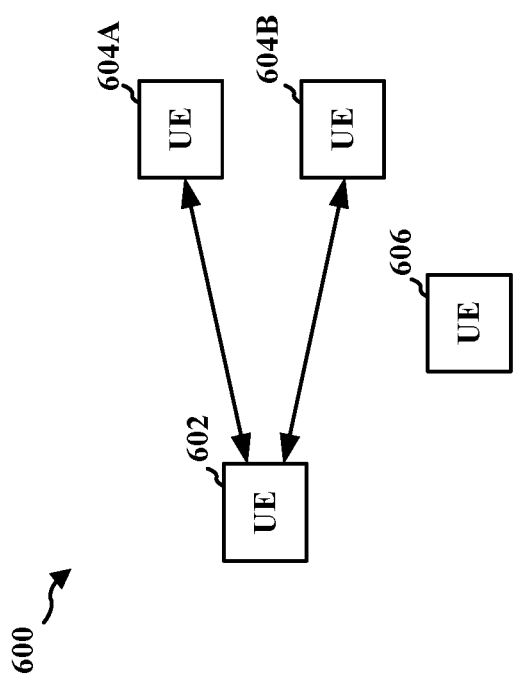

FIGS. 6A and 6B are diagrams illustrating communications between UEs. As illustrated in example 600 of FIG. 6A, a UE 602 may be performing ranging operations with UE 604A and UE 604B. The UE 602 may exchange a public safety message (PSM) or a road safety message (RSM) with the UE 604A and the UE 604B. The approximate GPS locations, which may be prone to high errors, may be indicated in the PSM or the RSM. Therefore, the UE 602, the UE 604A, and the UE 604B may be aware of the general location (e.g., zones in which each UE belongs) of each other without knowing the exact locations. The UEs may perform ranging operations to enable certain applications, such as digital key unlocking. Aspects provided herein may enable the UE 602, the UE 604A, or the UE 604B to enhance their communications based on their respective approximate locations so that a potential eavesdropper UE 606 may not be able to eavesdrop.

As illustrated in example 650 of FIG. 6B, a UE 652 may intend to communicate with another UE 654 and an eavesdropper UE 656 may be present. The UE 652 may be aware of the approximate location of the UE 654 and may not be aware of the exact location of the UE 654. The UE 652 may be able to communicate with the UE 654 via a RIS 660 or communicate directly with the UE 654. The RIS 660 may be configured by a base station 662 in the area. The UE 652 may be aware of a general direction of the eavesdropper UE 656 and there may be other UEs including the UE 658 in the same zone as the eavesdropper UE 656. Aspects provided herein may enable the UE 652 to enhance the communication with the UE 654 to be directionally secure against the eavesdropper UE 656. In some aspects, either the UE 652 or the UE 654 may transmit a potential direction or zone of the eavesdropper UE 656 to the base station 662. In some aspects, the base station 662 may determine the potential direction or zone of the eavesdropper UE 656.

Figure 7:
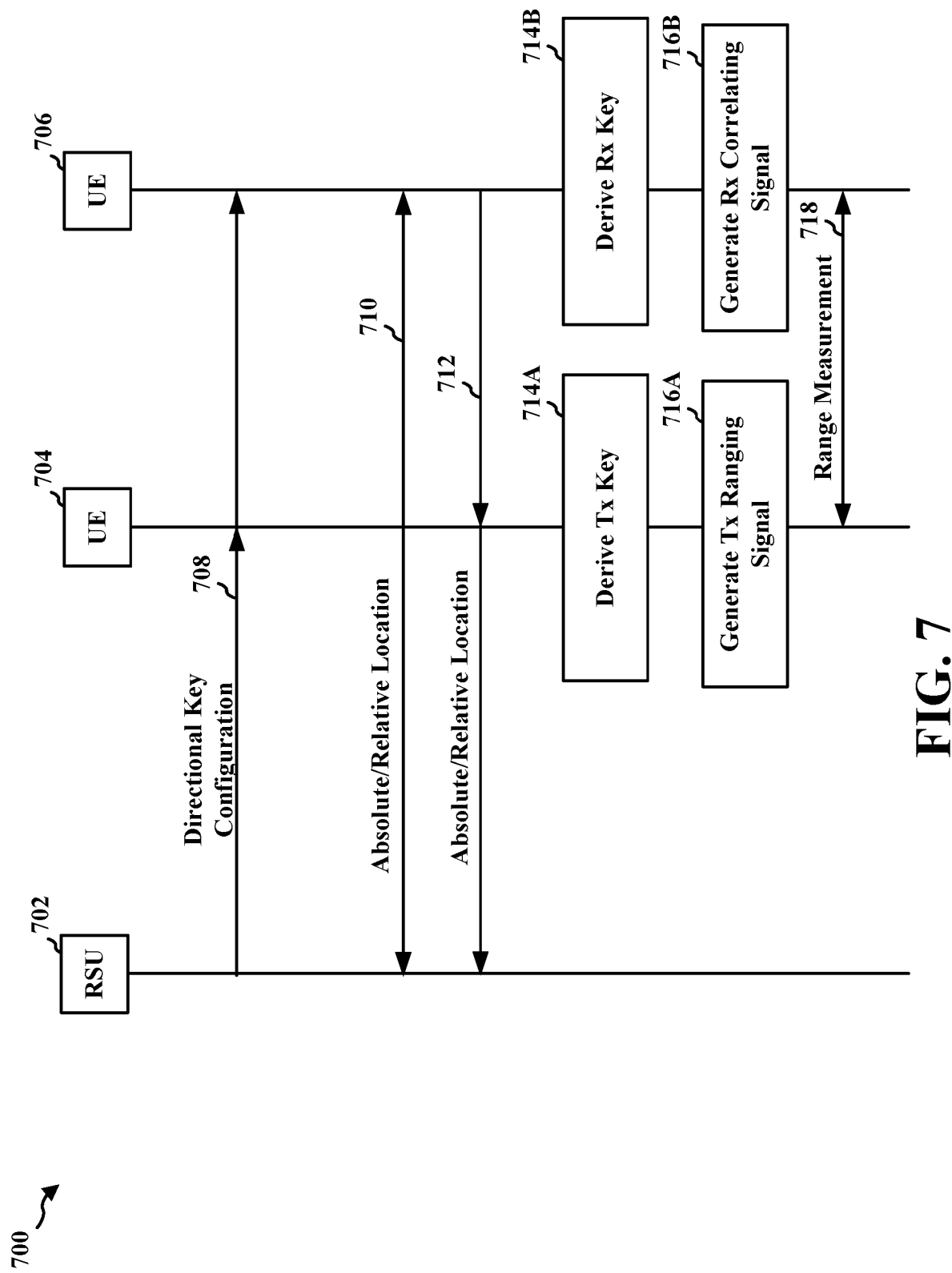
FIG. 7 is a diagram illustrating an example communication flow between UEs and a road-side unit (RSU).

FIG. 7 is a diagram 700 illustrating an example communication flow between UEs (the UE 704 and the UE 706) and an RSU 702 that enables location-based key generation for secure ranging. As illustrated in FIG. 7, the RSU 702 may transmit a directional key configuration 708 to the UE 704 and the UE 706. The directional key configuration 708 may include a set of shared keys $\{K_1, K_2, \ldots K_N\}$. The directional key configuration 708 may also include one or more location-based rules or AoA-based rules for using the set of shared keys.

The UE 704 and the UE 706 may be aware of each other's approximate location, such as a relative location or an absolute location, by exchanging communication, such as a PSM or a RSM with each together similar to the UE 602 and the UE 604A/B previously described in connection with FIG. 6A. As another example, the UE 704 and the UE 706 may exchange communication, such as a PSM or a RSM, to indicate a zone in which the UE is located. As illustrated in FIG. 7, the UE 704 may transmit an absolute/relative location 710 (in the form of an approximate location or zone) to the UE 706. The UE 704 may also transmit an absolute/relative location 710 (in the form of an approximate location or zone) to the RSU 702. Similarly, the UE 706 may transmit an absolute/relative location 712 (in the form of an approximate location or zone) to the UE 704. The UE 706 may also transmit an absolute/relative location 712 (in the form of an approximate location or zone) to the RSU 702.

Based on the rules associated with the directional key configuration 708, the UE 704 may derive transmission key at 714A and generate Tx ranging signal at 716A using the derived transmission key. The UE 706 may derive a reception key at 714B and generate Rx correlating signal related to the ranging signal at 716B using the derived reception key. After generating the Tx ranging signal at 716A and generating the Rx correlating signal related to the ranging signal at 716B, the UE 704 and the UE 706 may exchange range measurement 718. In some aspects, the UE 706 may correlate the received signal with the generated correlating signal based on to obtain the earliest time of arrival of the transmitted Tx signal. In some aspects, the rules may be configured before receiving the directional key configuration 708. In some aspects, the rules may be configured in the directional key configuration 708.

As one example, if the UE 704 is in zone-i ($Z_i$) and the UE 706 is in zone-j ($Z_j$), the UE 704 may use key $K_l$(l=1, 2, ..., N) to generate the ranging signal for transmission to the UE 706, while the UE 706 may use key $K_m$(m=1, 2, ..., N) to generate the ranging signal for transmission to the UE 704. In other words, the keys may be associated with a zone (which may be defined based on an absolute location or a relative location), and the keys may be used based on the zones in which the UE 706 and the UE 704 are located. In another example, the UE 704 and the UE 706 may choose the key based on the difference of zone locations. If $Z_i$, $Z_j$ denote the zones of UE 706 and the UE 704, respectively, the UE 706 and the UE 704 may choose key $K_1$ if $t_1 < |Z_i - Z_j| < t_2$, choose $K_2$ if $t_3 < |Z_i - Z_j| < t_4$, or the like, to generate a ranging signal.

As another example, if an expected AoA of a received signal at the UE 706 (as determined based on an approximate absolute location of UE 704) lies within a first defined angle range, the UE 704 may use key K 1 to generate the ranging signal for transmission to the UE 706. If expected AoA of the signal at the UE 706 lies within a second defined angle range, the UE 704 may use key $K_2$ to generate the ranging signal for transmission to the UE 706.

In some aspects, each key in the directional key configuration 708 which may include $\{K_1, K_2, \ldots, K_N\}$ may be configured for a group of UEs, such as a defined number of pairs of UEs in communication with the RSU 702. In some aspects, each key in the directional key configuration 708 which may include $\{K, K_2, \ldots, K_N\}$ may be configured for all UEs in communication with the RSU 702.

Figure 8:
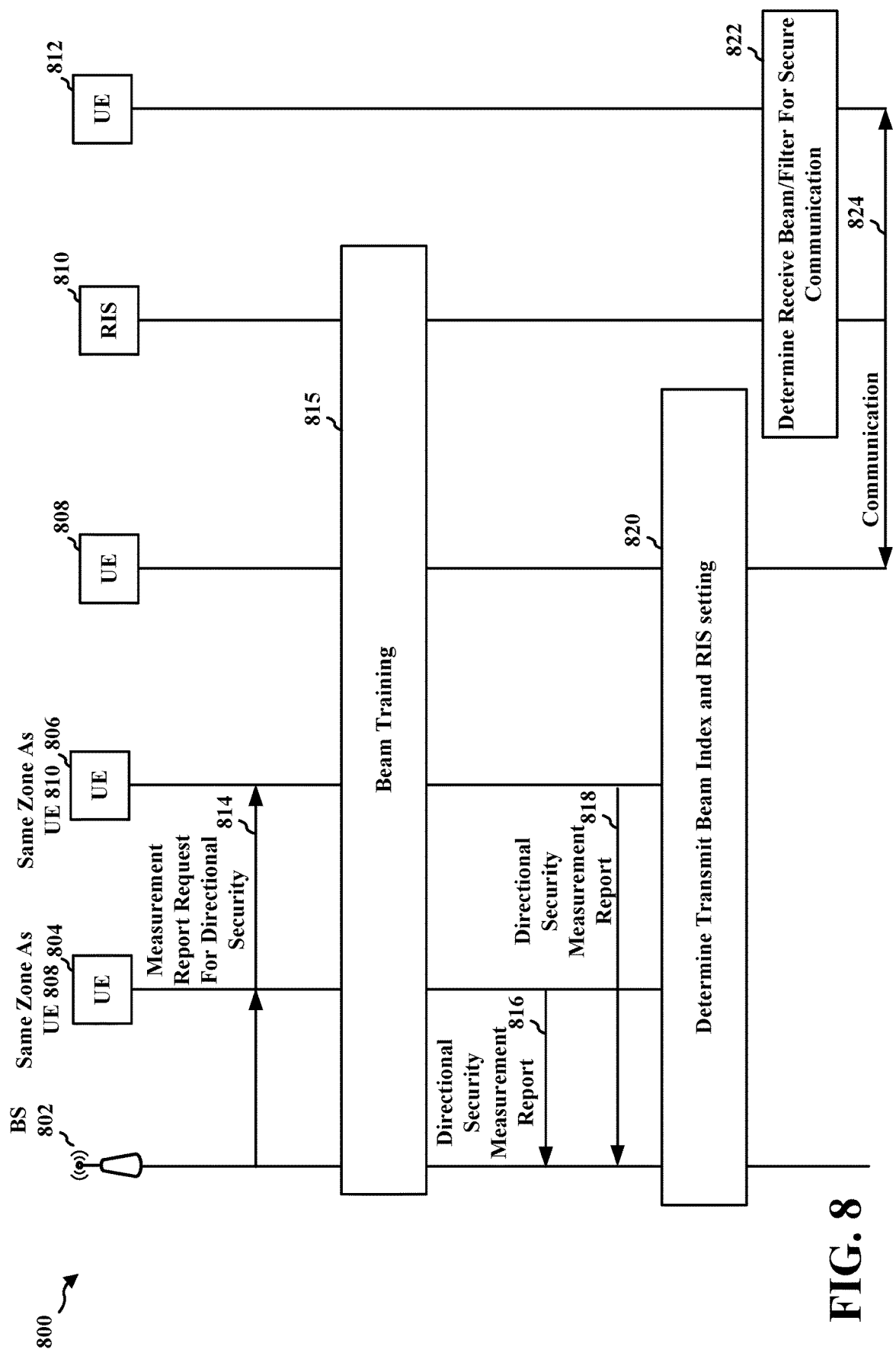
FIG. 8 is a diagram illustrating an example communication flow between a base station, UEs, and a MS.

FIG. 8 is a diagram 800 illustrating an example communication flow between a base station, UEs, and a MS. As illustrated in FIG. 8, a base station 802 may be in communication with one or more UEs, including the UE 804, the UE 806, the UE 808, and the UE 812. More UEs, such as an eavesdropper UE, may be present in the area. The base station 802 may also be in communication with and controlling a RIS 810. The UE 804 may be in the same zone as the UE 808, and the UE 806 may be in the same zone as the UE 812. Referring again to FIG. 8, the UE 808 may intend to communicate with UE 812 or to a group of UEs in the same zone as the UE 812. The UE 808 may also intend to make the communication directionally secure against the eavesdropper UE. In some aspects, either the UE 806 or the UE 808 may transmit a potential zone or direction associated with the eavesdropper UE to the base station 802.

To facilitate secure communication between the UE 808 and the UE 812, as illustrated in FIG. 8, the base station 802 may transmit a measurement report request 814 for directional security to the UE 804 and the UE 806. In some aspects, the base station 802 may receive a potential zone or direction associated with the eavesdropper UE from the UE 806 or the UE 808. In some aspects, the base station 802 may determine the potential zone or direction associated with the eavesdropper UE without signaling from the UE 806 or the UE 808. In some aspects, the UE 804 and the UE 806 may be randomly selected based on the zones in which the UE 808 and the UE 812 are located. In other words, the base station 802 may randomly select a UE in the same zone as the UE 808 as the UE 804 and may randomly select a UE in the same zone as the UE 812 as the UE 806. The base station 802 may also select the UE 804 and the UE 806 based on a capability. For example, one or more UEs in the same zone as the UE 808 may indicate their respective capability/willingness to cooperate in providing channel measurement reports to the base station 802, and one UE may be selected as the UE 804 based on the capability/willingness. Similarly, one or more UEs in the same zone as the UE 812 may indicate their respective capability/willingness to cooperate in providing channel measurement reports to the base station 802, and one UE of the one or more UEs may be selected as the UE 806 based on the capability/willingness. In some aspects, the base station 802 may also provide the time-frequency resources (which may be training resources) on which measurements may be performed along with the measurement report request 814. In some aspects, the measurement report request 814 may be transmitted via broadcasting (e.g., a broadcast message) to UEs in the respective zones. The broadcasting may be system information broadcast. Based on the measurement report request 814, the base station may receive directional security measurement report 816 from the UE 804 and directional security measurement report 818 from the UE 806.

At 815, the base station, the UE 808, the UE 806, and the RIS 810 may perform beam training. For example, the UE 808 may perform L transmit beam sweep (e.g., by changing the transmit filter w) during each of one or more RIS settings. If W denotes the number of possible RIS settings, there may be a total of LW beam sweeps that the UE 808 may perform. One or more UEs in the same zone with a potential eavesdropper may report their respective received power on all of those LW occasions. If denotes the received power of the $i^{th}$ UE for the $j^{th}$ occasion, where i=1, 2, ..., n (number of UEs), and j=1, 2, ..., LW. Received power at the RIS for the $k^{th}$ occasion may be denoted by $d_k$(k=1, 2, ..., LW). In some aspects, the base station 802 may choose an occasion $\ell \in \{1, 2, ..., LW\}$ which may correspond to the tuple (UE 802's transmit beam index, MS setting) such that the average received power (among reporting UEs) in the same zone with the potential eavesdropper is less than a first threshold (THR1), while the received power at the RIS is greater than a second threshold (THR2). In some aspects, if a valid occasion $\ell \in \{1, 2, ..., LW\}$ cannot be determined based on current thresholds, the base station 802 may increase the first threshold, decrease the second threshold, or increase the first threshold and decrease the second threshold until an occasion is determined at 820. The base station 802 may adjust the RIS 810 based on the determined occasion. The UE 812 may also be configured to determine receive beam/filter and change its receive filter based on the transmit beam index. The UE 808 may exchange communication 824 with the UE 812 through the RIS 810 (adjusted based on the determined RIS setting) based on the determined transmit beam index.

Figure 9:
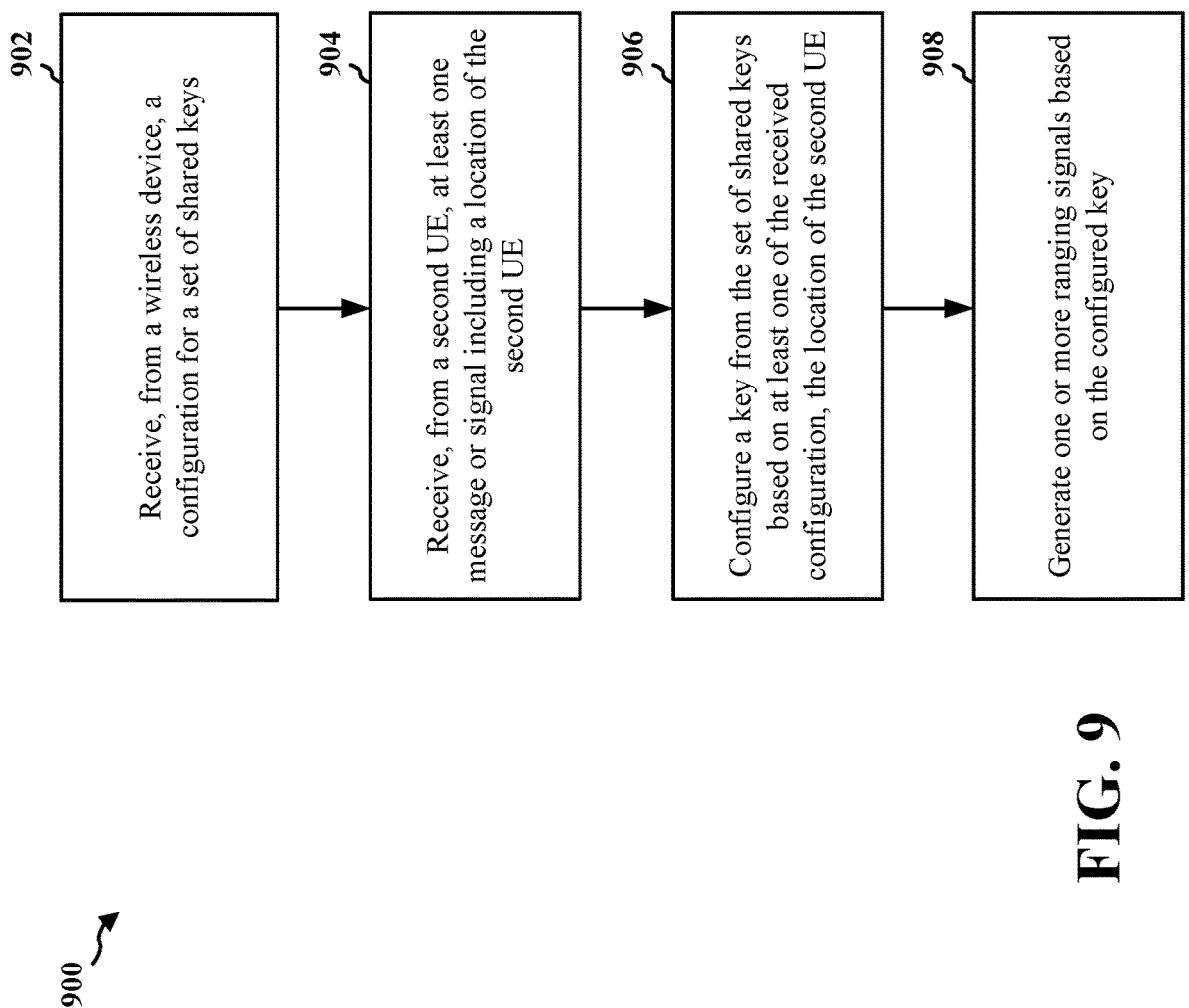
FIG. 9 is a flowchart of a method of wireless communication.

FIG. 9 is a flowchart 900 of a method of wireless communication. The method may be performed by a UE (e.g., the UE 104, the UE 704, other UEs; the apparatus 1402).

At 902, the UE may receive, from a wireless device, a configuration for a set of shared keys. For example, the UE 704 may receive, from a wireless device (e.g., the RSU 702), a configuration for a set of shared keys (e.g., the directional key configuration 708). In some aspects, 902 may be performed by ranging component 1442 of FIG. 14.

At 904, the UE may receive, from a second UE, at least one message or signal including a location of the second UE. The received at least one message or signal may be associated with an AoA. For example, the UE 704 may receive, from a second UE 706, at least one message or signal including a location of the second UE (e.g., the absolute/relative location 712). In some aspects, 904 may be performed by ranging component 1442 of FIG. 14.

At 906, the UE may configure a key from the set of shared keys based on at least one of the received configuration, the location of the second UE, the AoA of the received at least one message or signal, or a location of the first UE. For example, the UE 704 may configure a key from the set of shared keys based on at least one of the received configuration, the location of the second UE, the AoA of the received at least one message or signal, or a location of the first UE (e.g., derive transmission key at 714A). In some aspects, 906 may be performed by ranging component 1442 of FIG. 14.

At 908, the UE may generate one or more ranging signals based on the configured key. The one or more ranging signals may be directionally secure based on the location of the second UE. For example, the UE 704 may generate one or more ranging signals based on the configured key (e.g., generate Tx ranging signal at 716A). In some aspects, 908 may be performed by ranging component 1442 of FIG. 14.

Figure 10:
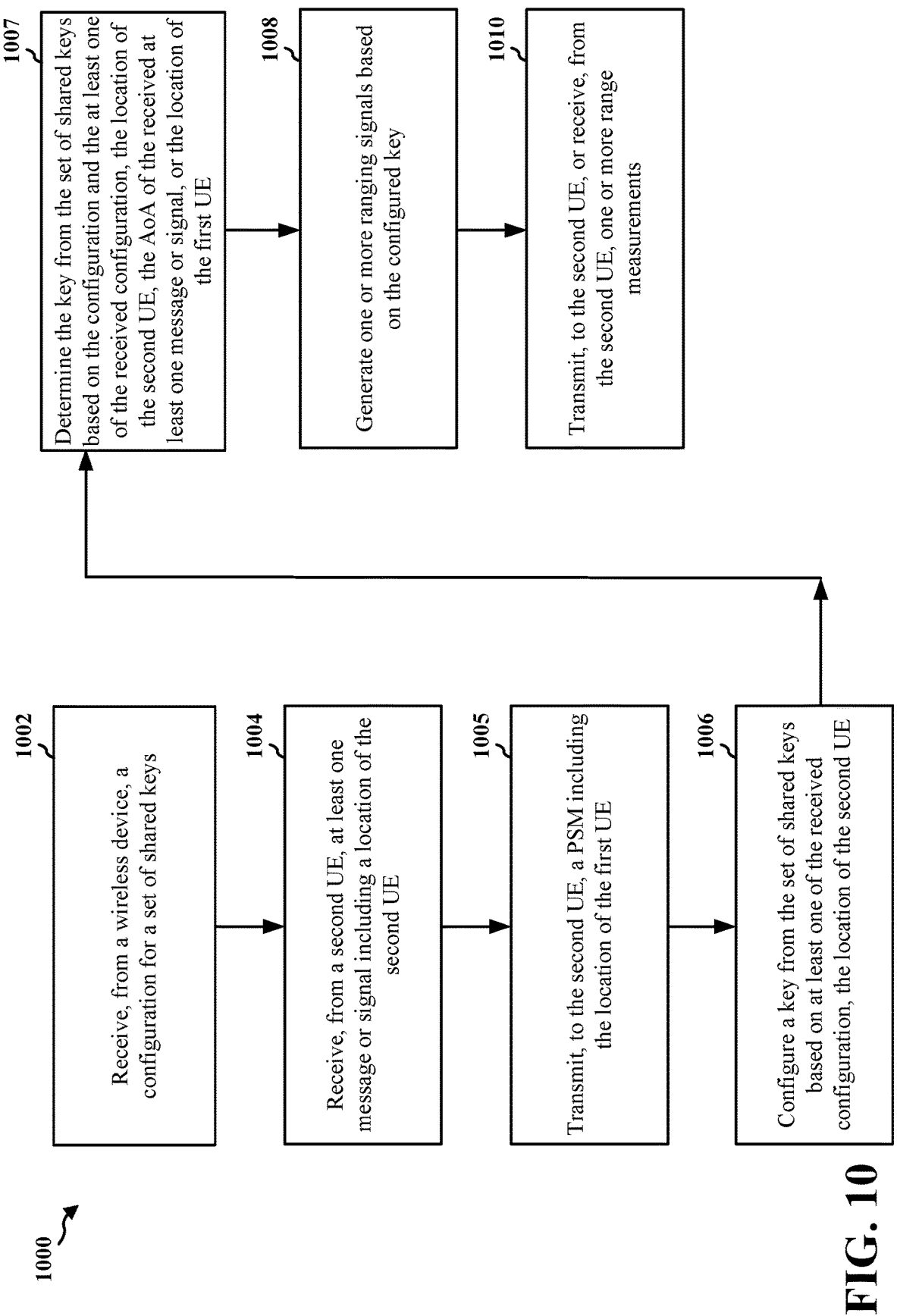
FIG. 10 is a flowchart of a method of wireless communication.

FIG. 10 is a flowchart 1000 of a method of wireless communication. The method may be performed by a UE (e.g., the UE 104, the UE 704, other UEs; the apparatus 1402).

At 1002, the UE may receive, from a wireless device, a configuration for a set of shared keys. For example, the UE 704 may receive, from a wireless device (e.g., the RSU 702), a configuration for a set of shared keys (e.g., the directional key configuration 708). In some aspects, 1002 may be performed by ranging component 1442 of FIG. 14. In some aspects, the wireless device may be an RSU. In some aspects, the set of shared keys may include one or more shared keys. In some aspects, each of the one or more shared keys may be associated with a respective distance, a respective AoA, or a respective zone.

At 1004, the UE may receive, from a second UE, at least one message or signal including a location of the second UE. The received at least one message or signal may be associated with an AoA. In some aspects, the location of the second UE is an absolute location or a relative location. For example, the UE 704 may receive, from a second UE 706, at least one message or signal including a location of the second UE (e.g., the absolute/relative location 712). In some aspects, 1004 may be performed by ranging component 1442 of FIG. 14. In some aspects, the at least one message may be a PSM or an RSM. In some aspects, the location of the second UE may be associated with a location zone of the second UE.

In some aspects, at 1005, the UE may transmit, to the second UE, a PSM including the location of the first UE. In some aspects, the location of the first UE is an absolute location or a relative location. The transmitted PSM may be associated with the AoA. For example, the UE 704 may transmit to the second UE 706, a PSM including the location of the first UE (e.g., the absolute/relative location 710). In some aspects, 1005 may be performed by ranging component 1442 of FIG. 14.

At 1006, the UE may configure a key from the set of shared keys based on at least one of the received configuration, the location of the second UE, the AoA of the received at least one message or signal, or a location of the first UE. For example, the UE 704 may configure a key from the set of shared keys based on at least one of the received configuration, the location of the second UE, the AoA of the received at least one message or signal, or a location of the first UE (e.g., derive transmission key at 714A). In some aspects, 1006 may be performed by ranging component 1442 of FIG. 14.

In some aspects, to configure the key from the set of shared keys, the UE may, at 1007, determine the key from the set of shared keys based on the configuration and the at least one of the received configuration, the location of the second UE, the AoA of the received at least one message or signal, or the location of the first UE. In some aspects, each of the one or more shared keys may be associated with a different UE. In some aspects, 1007 may be performed by ranging component 1442 of FIG. 14.

At 1008, the UE may generate one or more ranging signals based on the configured key. The one or more ranging signals may be directionally secure based on the location of the second UE. For example, the UE 704 may generate one or more ranging signals based on the configured key (e.g., generate Tx ranging signal at 716A). In some aspects, 1008 may be performed by ranging component 1442 of FIG. 14.

In some aspects, at 1010, the UE may transmit, to the second UE, or receive, from the second UE, one or more range measurements. For example, the UE 704 may transmit, to the second UE 706, or receive, from the second UE 706, one or more range measurements 718. In some aspects, 1010 may be performed by ranging component 1442 of FIG. 14.

Figure 11:
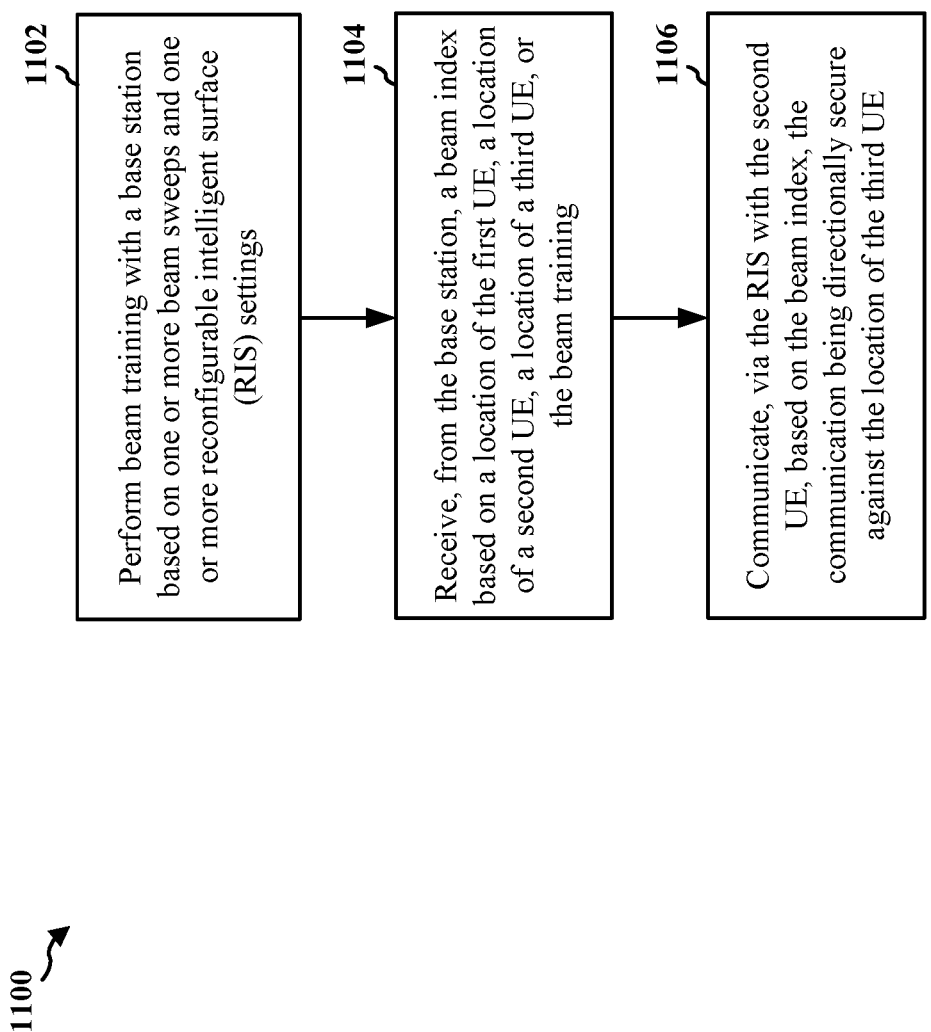
FIG. 11 is a flowchart of a method of wireless communication.

FIG. 11 is a flowchart 1100 of a method of wireless communication. The method may be performed by a UE (e.g., the UE 104, the UE 808, other UEs; the apparatus 1402).

At 1102, the UE may perform beam training with a base station based on one or more beam sweeps and one or more RIS settings. For example, the UE 808 may perform beam training with a base station 802 based on one or more beam sweeps and one or more RIS settings (e.g., the beam training at 815). In some aspects, 1102 may be performed by directional security component 1444 of FIG. 14.

At 1104, the UE may receive, from the base station, a beam index based on a location of the first UE, a location of a second UE, a location of a third UE, or the beam training. For example, the UE 808 may receive, from the base station 802, a beam index (e.g., the beam index at 820) based on a location of the first UE 808, a location of a second UE 812, a location of a third UE such as a potential eavesdropper, or the beam training. In some aspects, 1104 may be performed by directional security component 1444 of FIG. 14.

At 1106, the UE may communicate, via the RIS with the second UE 812, based on the beam index. The communication may be directionally secure against the location of the third UE. For example, the UE 808 may communicate, via the MS 810 with the second UE 812 at 824. In some aspects, 1106 may be performed by directional security component 1444 of FIG. 14.

Figure 12:
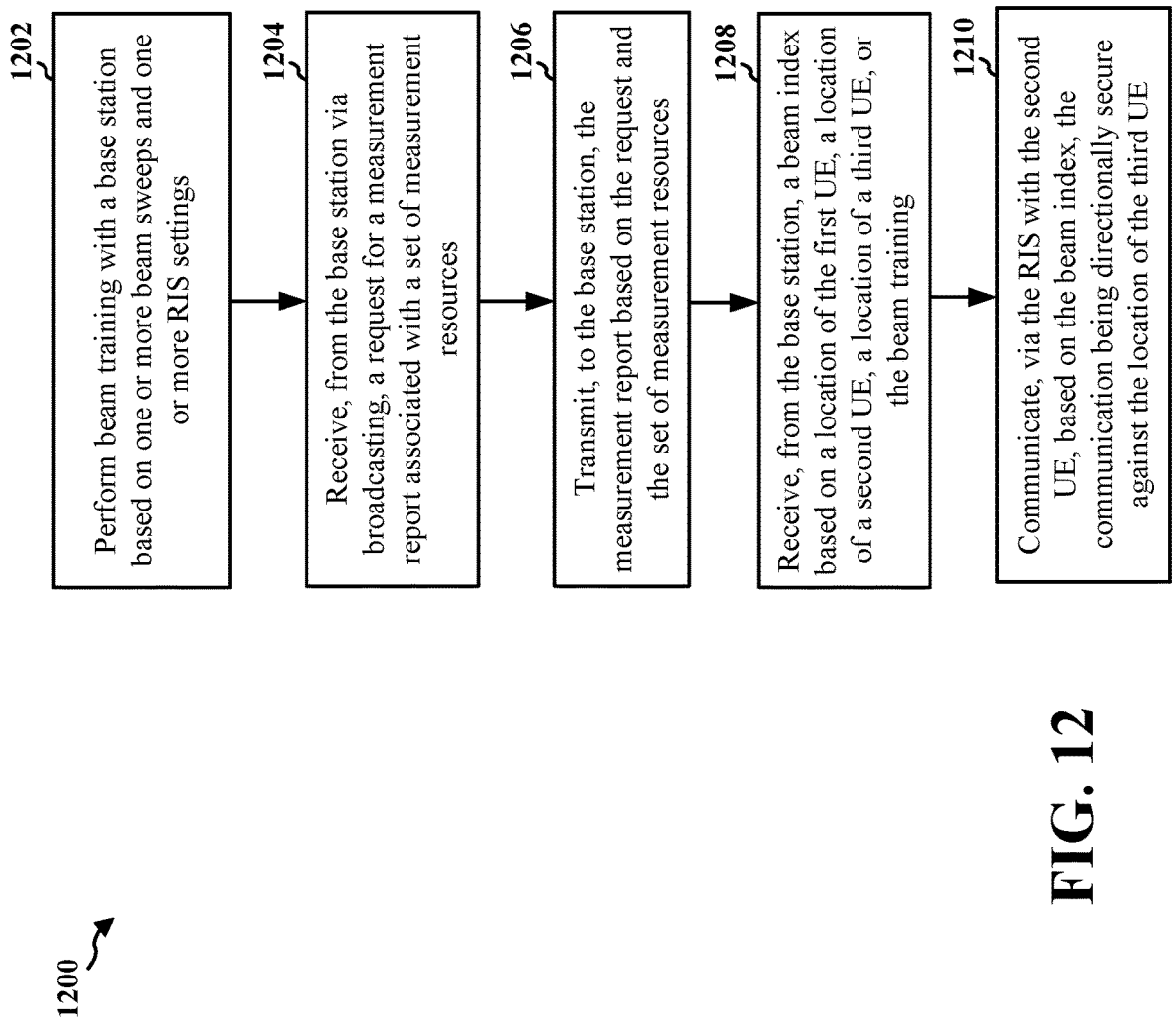
FIG. 12 is a flowchart of a method of wireless communication.

FIG. 12 is a flowchart 1200 of a method of wireless communication. The method may be performed by a UE (e.g., the UE 104, the UE 808, other UEs; the apparatus 1402).

At 1202, the UE may perform beam training with a base station based on one or more beam sweeps and one or more RIS settings. For example, the UE 808 may perform beam training with a base station 802 based on one or more beam sweeps and one or more RIS settings (e.g., the beam training at 815). In some aspects, 1202 may be performed by directional security component 1444 of FIG. 14. In some aspects, the beam training may include adapting a transmission filter of the first UE so that a first average received power for the communication within a first zone based on the location of the second UE is higher than a first threshold and a second average received power for the communication within a second zone based on the location of the third UE is lower than a second threshold. In some aspects, the beam training may further include decreasing the first threshold and increasing the second threshold upon a failure to adapt the transmission filter. Therefore, the beam training may continue to adjust the thresholds until the transmission filter is adapted. In some aspects, the one or more RIS settings may include W RIS settings, and the one or more beam sweeps may include L beam sweeps for each of the W RIS settings, L and W may be positive integers.

In some aspects, at 1204, the UE may receive, from the base station via broadcasting, a request for a measurement report associated with a set of measurement resources. For example, the UE 808 or the UE 804 may receive, from the base station 802 via broadcasting, a request for a measurement report (e.g., 814) associated with a set of measurement resources. In some aspects, 1204 may be performed by directional security component 1444 of FIG. 14.

In some aspects, at 1206, the UE may transmit, to the base station, the measurement report based on the request and the set of measurement resources. For example, the UE 808 or the UE 804 may transmit, to the base station 802, the measurement report (e.g., 816) based on the request and the set of measurement resources. In some aspects, 1206 may be performed by directional security component 1444 of FIG. 14.

At 1208, the UE may receive, from the base station, a beam index based on a location of the first UE, a location of a second UE, a location of a third UE, or the beam training. For example, the UE 808 may receive, from the base station 802, a beam index (e.g., the beam index at 820) based on a location of the first UE 808, a location of a second UE 812, a location of a third UE such as a potential eavesdropper, or the beam training. In some aspects, 1208 may be performed by directional security component 1444 of FIG. 14.

At 1210, the UE may communicate, via the RIS with the second UE 812, based on the beam index. The communication may be directionally secure against the location of the third UE. For example, the UE 808 may communicate, via the MS 810 with the second UE 812 at 824. In some aspects, 1210 may be performed by directional security component 1444 of FIG. 14.

Figure 13:
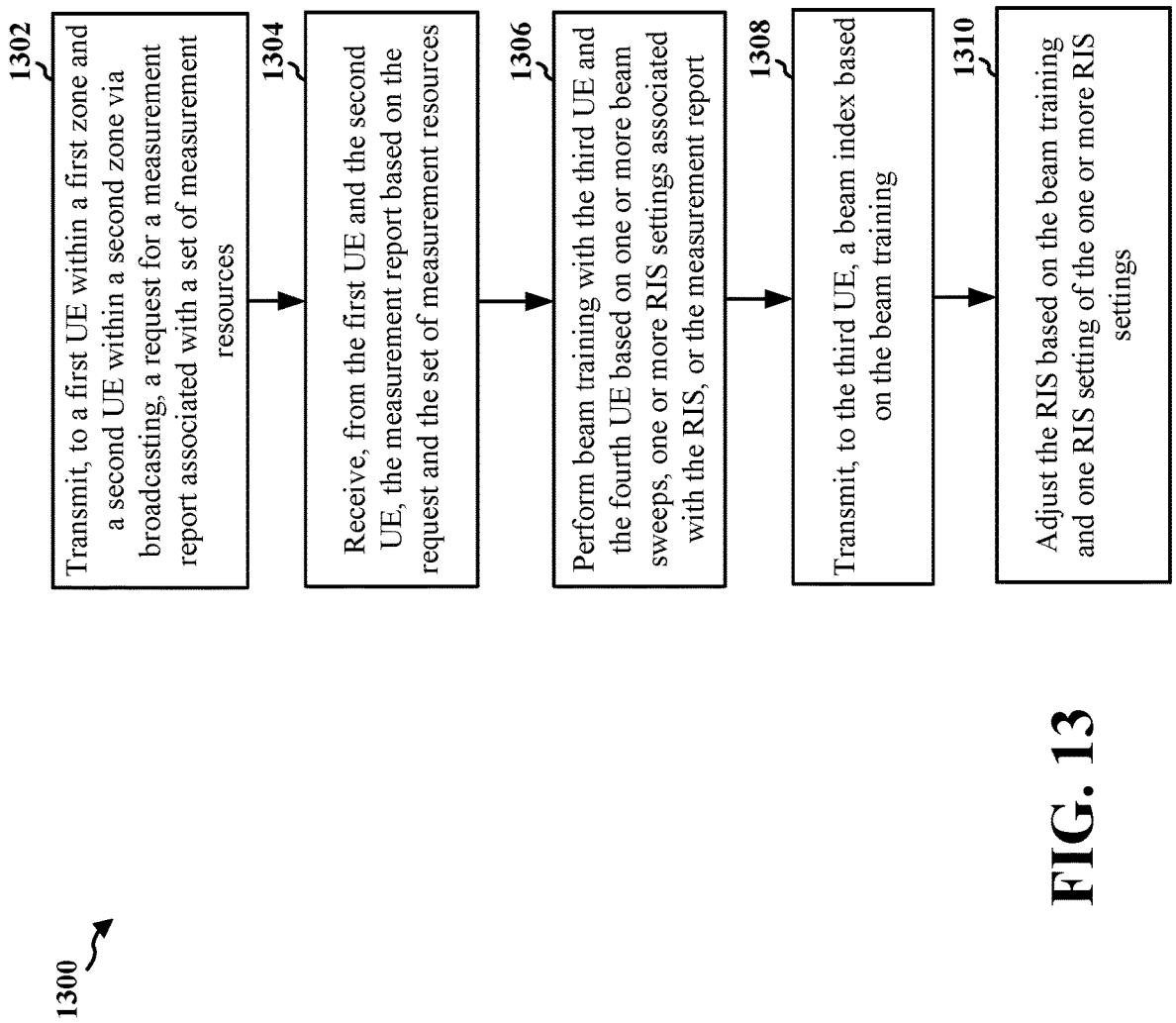
FIG. 13 is a flowchart of a method of wireless communication.

FIG. 13 is a flowchart 1300 of a method of wireless communication. The method may be performed by a base station (e.g., the base station 102/180, the base station 802; the apparatus 1502).

At 1302, the base station may transmit, to a first UE within a first zone and a second UE within a second zone via broadcasting, a request for a measurement report associated with a set of measurement resources. For example, the base station 802 may transmit, to a first UE 804 within a first zone and a second UE 806 within a second zone via broadcasting, a request for a measurement report (e.g., 814) associated with a set of measurement resources. In some aspects, 1302 may be performed by measurement component 1542 of FIG. 15. In some aspects, the first UE and the second UE may be randomly selected (within the respective zones). In some aspects, the first UE and the second UE may be selected based on a capability of providing the measurement report.

At 1304, the base station may receive, from the first UE and the second UE, the measurement report based on the request and the set of measurement resources. For example, the base station 802 may receive, from the first UE 804 and the second UE 804, the measurement report (e.g., 816 and 818) based on the request and the set of measurement resources. In some aspects, 1304 may be performed by measurement component 1542 of FIG. 15. In some aspects, after receiving the measurements from the first UE and the second UE, the base station may derive or extrapolate the measurements to obtain the channel of another UE, such as an eavesdropper UE, the third UE, or the fourth UE. In some aspects, if there is no extrapolation done, the base station may further transmit a request for a measurement report to the third UE or the fourth UE and receive the measurement report based on the request from the third UE or the fourth UE.

At 1306, the base station may perform beam training with the third UE or the fourth UE based on one or more beam sweeps, one or more RIS settings associated with the RIS, or the measurement report. For example, the base station 802 may perform beam training with the third UE 808 (e.g., at 814) or the fourth UE 812 (e.g., at 822) based on one or more beam sweeps, one or more RIS settings associated with the RIS 810, or the measurement report. In some aspects, 1306 may be performed by beam component 1544 of FIG. 15. In some aspects, the beam training may include adapting a transmission filter of the third UE so that a first average received power for the communication within the second zone is higher than a first threshold and a second average received power for the communication within a third zone associated with a fifth UE is lower than a second threshold. In some aspects, the beam training may further include decreasing the first threshold and increasing the second threshold upon a failure to adapt the transmission filter. In some aspects, the beam training may include adapting a reception filter of the fourth UE. In some aspects, the one or more MS settings may include W RIS settings, and the one or more beam sweeps may include L beam sweeps for each of the W RIS settings, L and W may be positive integers.

At 1308, the base station may transmit, to the third UE, a beam index based on the beam training. For example, the base station 802 may transmit, to the third UE 808, a beam index (e.g., beam index at 820) based on the beam training. In some aspects, 1308 may be performed by beam component 1544 of FIG. 15.

At 1310, the base station may adjust the MS based on the beam training and one RIS setting of the one or more MS settings. For example, the base station 802 may adjust the RIS 810 based on the beam training and one MS setting of the one or more RIS settings. In some aspects, 1310 may be performed by adjust component 1546 of FIG. 15.

Figure 14:
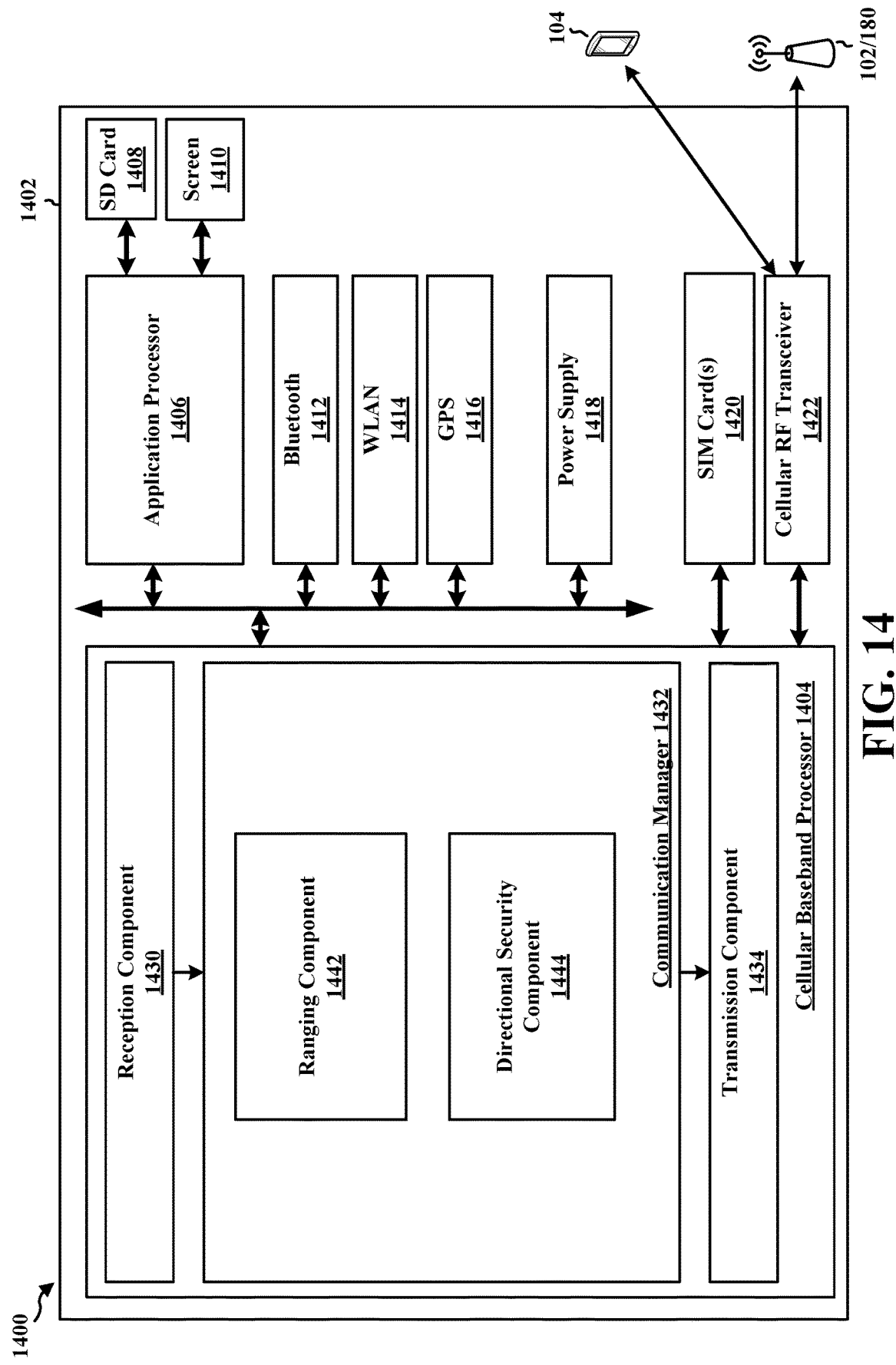
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include a ranging component 1442 that is configured to receive, from a wireless device, a configuration for a set of shared keys, e.g., as described in connection with 902 in FIG. 9, or 1002 in FIG. 10. The ranging component 1442 may be further configured to receive, from a second UE, at least one message or signal including a location of the second UE, e.g., as described in connection with 904 in FIG. 9, or 1004 in FIG. 10. The ranging component 1442 may be further configured to transmit, to the second UE, a PSM including the location of the first UE, e.g., as described in connection with 1005 in FIG. 10. The ranging component 1442 may be further configured to configure a key from the set of shared keys based on at least one of the received configuration, the location of the second UE, e.g., as described in connection with 906 in FIG. 9, or 1006 in FIG. 10. The ranging component 1442 may be further configured to determine the key from the set of shared keys based on the configuration and the at least one of the received configuration, the location of the second UE, the AoA of the received at least one message or signal, or the location of the first UE, e.g., as described in connection with 1007 in FIG. 10. The ranging component 1442 may be further configured to generate one or more ranging signals based on the configured key, e.g., as described in connection with 908 in FIG. 9, or 1008 in FIG. 10. The ranging component 1442 may be further configured to transmit, to the second UE, or receive, from the second UE, one or more range measurements, e.g., as described in connection with 1010 in FIG.

The communication manager 1432 may further include a directional security component 1444 that may be configured to perform beam training with a base station based on one or more beam sweeps and one or more RIS settings, e.g., as described in connection with 1102 in FIG. 11, or 1202 in FIG. 12. The directional security component 1444 may be further configured to receive, from the base station via broadcasting, a request for a measurement report associated with a set of measurement resources, e.g., as described in connection with 1204 in FIG. 12. The directional security component 1444 may be further configured to transmit, to the base station, the measurement report based on the request and the set of measurement resources, e.g., as described in connection with 1206 in FIG. 12. The directional security component 1444 may be further configured to receive, from the base station, a beam index based on a location of the first UE, a location of a second UE, a location of a third UE, or the beam training, e.g., as described in connection with 1104 in FIG. 11, or 1208 in FIG. 12. The directional security component 1444 may be further configured to communicate, via the MS with the second UE, based on the beam index, the communication being directionally secure against the location of the third UE, e.g., as described in connection with 1106 in FIG. 11, or 1210 in FIG. 12.

The apparatus may include additional components that perform each of the blocks of the algorithm in the flowcharts of FIGS. 9-12. As such, each block in the flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for receiving, from a wireless device, a configuration for a set of shared keys. The cellular baseband processor 1404 may further include means for receiving, from a second UE, at least one message or signal including a location of the second UE. The cellular baseband processor 1404 may further include means for transmitting, to the second UE, a PSM including the location of the first UE. The cellular baseband processor 1404 may further include means for configuring a key from the set of shared keys based on at least one of the received configuration, the location of the second UE. The cellular baseband processor 1404 may further include means for determining the key from the set of shared keys based on the configuration and the at least one of the received configuration, the location of the second UE, the AoA of the received at least one message or signal, or the location of the first UE. The cellular baseband processor 1404 may further include means for generating one or more ranging signals based on the configured key. The cellular baseband processor 1404 may further include means for transmitting, to the second UE, or receive, from the second UE, one or more range measurements. The cellular baseband processor 1404 may further include means for performing beam training with a base station based on one or more beam sweeps and one or more RIS settings. The cellular baseband processor 1404 may further include means for receiving, from the base station via broadcasting, a request for a measurement report associated with a set of measurement resources. The cellular baseband processor 1404 may further include means for transmitting, to the base station, the measurement report based on the request and the set of measurement resources. The cellular baseband processor 1404 may further include means for receiving, from the base station, a beam index based on a location of the first UE, a location of a second UE, a location of a third UE, or the beam training. The cellular baseband processor 1404 may further include means for communicating, via the RIS with the second UE, based on the beam index, the communication being directionally secure against the location of the third UE.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
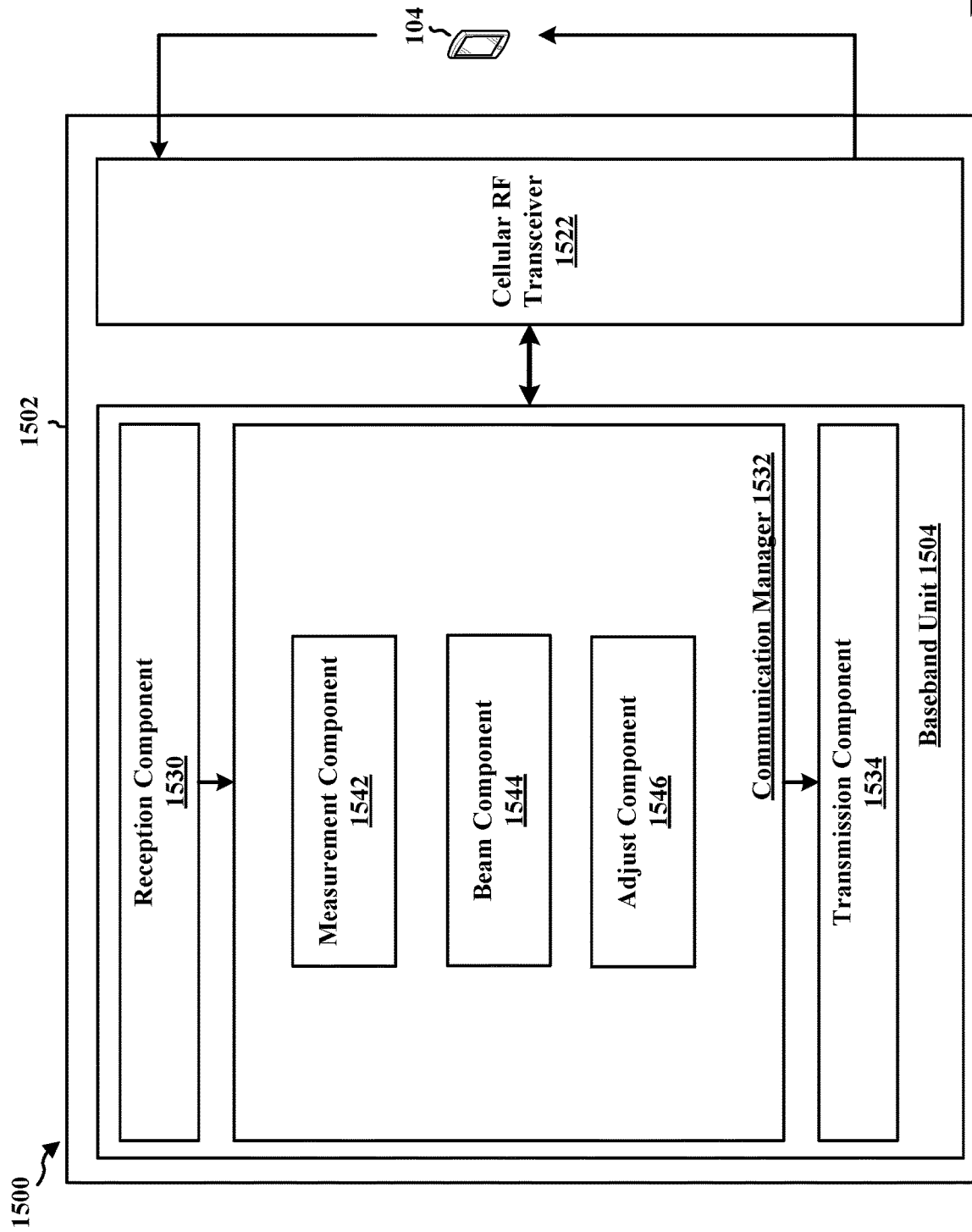
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1402 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 may include a measurement component 1542 that may transmit, to a first UE within a first zone and a second UE within a second zone via broadcasting, a request for a measurement report associated with a set of measurement resources and receive, from the first UE and the second UE, the measurement report based on the request and the set of measurement resources, e.g., as described in connection with 1302 and 1304 in FIG. 13. The communication manager 1532 further may include a beam component 1544 that may perform beam training with the third UE and the fourth UE based on one or more beam sweeps, one or more RIS settings associated with the RIS, or the measurement report and transmit, to the third UE, a beam index based on the beam training, e.g., as described in connection with 1306 and 1308 in FIG. 13. The communication manager 1532 further may include an adjust component 1546 that may adjust the RIS based on the beam training and one RIS setting of the one or more MS settings, e.g., as described in connection with 1310 in FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, may include means for transmitting, to a first UE within a first zone and a second UE within a second zone via broadcasting, a request for a measurement report associated with a set of measurement resources. The baseband unit 1504 may further include means for receiving, from the first UE and the second UE, the measurement report based on the request and the set of measurement resources. The baseband unit 1504 may further include means for performing beam training with the third UE and the fourth UE based on one or more beam sweeps, one or more RIS settings associated with the RIS, or the measurement report. The baseband unit 1504 may further include means for transmitting, to the third UE, a beam index based on the beam training. The baseband unit 1504 may further include means for adjusting the MS based on the beam training and one RIS setting of the one or more RIS settings. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

As one example, secure communications may be realized by having a common fixed shared key between transmitters and receiver. However, the common fixed shared key may still be under the risk of being eavesdropped. Some example aspects provided herein provide a more robust and secure method of sharing keys between communication end points. By configuring a set of shared keys and utilizing individual keys based on locations, a potential eavesdropper may not be able to eavesdrop communications even if the eavesdropper obtained the shared keys. Some other examples aspects provided herein may enable directionally secure communications by communicating via a MS. With the aid of a base station, by adjusting reception filter on the receiver, transmission filter on a transmitter, and RIS settings, communications between two UEs may be directional secure against a potential eavesdropper in particular directions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE, comprising: a memory; and at least one processor coupled to the memory and configured to: receive, from a wireless device, a configuration for a set of shared keys; receive, from a second UE, at least one message or signal including a location of the second UE, the received at least one message or signal being associated with an AoA; configure a key from the set of shared keys based on at least one of the received configuration, the location of the second UE, the AoA of the received at least one message or signal, or a location of the first UE; and generate one or more ranging signals based on the configured key, the one or more ranging signals being directionally secure based on the location of the second UE.

Aspect 2 is the apparatus of aspect 1, wherein the at least one processor coupled to the memory is further configured to: transmit, to the second UE, a PSM including the location of the first UE, wherein the transmitted PSM is associated with the AoA.

Aspect 3 is the apparatus of any of aspects 1-2, wherein the wireless device is a RSU.

Aspect 4 is the apparatus of any of aspects 1-3, wherein the location of the first UE is an absolute location or a relative location, and the location of the second UE is an absolute location or a relative location.

Aspect 5 is the apparatus of any of aspects 1-4, wherein the at least one message is a PSM or a RSM.

Aspect 6 is the apparatus of any of aspects 1-5, wherein the location of the second UE is associated with a location zone of the second UE.

Aspect 7 is the apparatus of any of aspects 1-6, wherein the at least one processor coupled to the memory is further configured to: transmit, to the second UE, or receive, from the second UE, one or more range measurements.

Aspect 8 is the apparatus of any of aspects 1-7, wherein the set of shared keys comprises one or more shared keys, wherein each of the one or more shared keys is associated with a respective distance, a respective AoA, or a respective zone.

Aspect 9 is the apparatus of any of aspects 1-8, wherein to configure the key from the set of shared keys, the at least one processor coupled to the memory is further configured to: determine the key from the set of shared keys based on the configuration and the at least one of the received configuration, the location of the second UE, the AoA of the received at least one message or signal, or the location of the first UE.

Aspect 10 is the apparatus of any of aspects 1-9, wherein each of the one or more shared keys is associated with a different UE.

Aspect 11 is the apparatus of any of aspects 1-11, further comprising a transceiver coupled to the at least one processor.

Aspect 12 is an apparatus for wireless communication at a first UE, comprising: a memory; and at least one processor coupled to the memory and configured to: perform beam training with a base station based on one or more beam sweeps and one or more RIS settings; receive, from the base station, a beam index based on a location of the first UE, a location of a second UE, a location of a third UE, or the beam training; and communicate, via the RIS with the second UE, based on the beam index, the communication being directionally secure against the location of the third UE.

Aspect 13 is the apparatus of aspect 12, wherein the beam training comprises adapting a transmission filter of the first UE so that a first average received power for the communication within a first zone based on the location of the second UE is higher than a first threshold and a second average received power for the communication within a second zone based on the location of the third UE is lower than a second threshold.

Aspect 14 is the apparatus of any of aspects 12-13, wherein the beam training further comprises decreasing the first threshold and increasing the second threshold upon a failure to adapt the transmission filter.

Aspect 15 is the apparatus of any of aspects 12-14, wherein the at least one processor coupled to the memory is further configured to: receive, from the base station via broadcasting, a request for a measurement report associated with a set of measurement resources, the request being associated with a communication between the first UE and the second UE; and transmit, to the base station, the measurement report based on the request and the set of measurement resources.

Aspect 16 is the apparatus of any of aspects 12-15, wherein the one or more RIS settings comprises W RIS settings, and wherein the one or more beam sweeps comprises L beam sweeps for each of the W RIS settings, where L and W are positive integers.

Aspect 17 is the apparatus of any of aspects 12-16 further comprising a transceiver coupled to the at least one processor.

Aspect 18 is an apparatus for wireless communication at a base station, comprising: a memory; and at least one processor coupled to the memory and configured to: transmit, to a first UE within a first zone and a second UE within a second zone via broadcasting, a request for a measurement report associated with a set of measurement resources, the request being associated with a communication via a RIS between a third UE within the first zone and a fourth UE within the second zone; receive, from the first UE and the second UE, the measurement report based on the request and the set of measurement resources; perform beam training with the third UE or the fourth UE based on one or more beam sweeps, one or more RIS settings associated with the RIS, or the measurement report; transmit, to the third UE, a beam index based on the beam training; and adjust the RIS based on the beam training and one RIS setting of the one or more RIS settings.

Aspect 19 is the apparatus of aspect 18, wherein the beam training comprises adapting a transmission filter of the third UE so that a first average received power for the communication within the second zone is higher than a first threshold and a second average received power for the communication within a third zone associated with a fifth UE is lower than a second threshold.

Aspect 20 is the apparatus of any of aspects 18-19, wherein the beam training further comprises decreasing the first threshold and increasing the second threshold upon a failure to adapt the transmission filter.

Aspect 21 is the apparatus of any of aspects 18-20, wherein the beam training comprises adapting a reception filter of the fourth UE.

Aspect 22 is the apparatus of any of aspects 18-21, wherein the first UE and the second UE are randomly selected.

Aspect 23 is the apparatus of any of aspects 18-22, wherein the first UE and the second UE are selected based on a capability of providing the measurement report.

Aspect 24 is the apparatus of any of aspects 18-23, wherein the one or more RIS settings comprises W RIS settings, and wherein the one or more beam sweeps comprises L beam sweeps for each of the W RIS settings, where L and W are positive integers.

Aspect 25 is the apparatus of any of aspects 18-24, further comprising a transceiver coupled to the at least one processor.

Aspect 26 is a method of wireless communication for implementing any of aspects 1 to 11.

Aspect 27 is an apparatus for wireless communication including means for implementing any of aspects 1 to 11.

Aspect 28 is a computer-readable medium storing computer executable code, where the code when executed by a processor causes the processor to implement any of aspects 1 to 11.

Aspect 29 is a method of wireless communication for implementing any of aspects 12 to 17.

Aspect 30 is an apparatus for wireless communication including means for implementing any of aspects 12 to 17.

Aspect 31 is a computer-readable medium storing computer executable code, where the code when executed by a processor causes the processor to implement any of aspects 12 to 17.

Aspect 32 is a method of wireless communication for implementing any of aspects 18 to 25.

Aspect 33 is an apparatus for wireless communication including means for implementing any of aspects 18 to 25.

Aspect 34 is a computer-readable medium storing computer executable code, where the code when executed by a processor causes the processor to implement any of aspects 18 to 25.

What is claimed is:

1. An apparatus for wireless communication at a first user equipment UE, comprising:
   a memory; and
   at least one processor coupled to the memory and configured to:
      receive, from a wireless device, a configuration for a set of shared keys;
      receive, from a second UE, at least one message or signal including a location of the second UE, the received at least one message or signal being associated with an angle of arrival (AoA);
      configure a key from the set of shared keys based on at least one of the received configuration, the location of the second UE, the AoA of the received at least one message or signal, or a location of the first UE; and
      generate one or more ranging signals based on the configured key, the one or more ranging signals being directionally secure based on the location of the second UE.

2. The apparatus of claim 1, wherein the at least one processor coupled to the memory is further configured to:
   transmit, to the second UE, a public service message (PSM) including the location of the first UE, wherein the transmitted PSM is associated with the AoA.

3. The apparatus of claim 1, wherein the wireless device is a road-side unit (RSU).

4. The apparatus of claim 1, wherein the location of the first UE is an absolute location or a relative location, and the location of the second UE is an absolute location or a relative location.

5. The apparatus of claim 1, wherein the at least one message is a public service message (PSM) or a road safety message (RSM).

6. The apparatus of claim 1, wherein the location of the second UE is associated with a location zone of the second UE.

7. The apparatus of claim 1, wherein the at least one processor coupled to the memory is further configured to:
   transmit, to the second UE, or receive, from the second UE, one or more range measurements.

8. The apparatus of claim 1, wherein the set of shared keys comprises one or more shared keys, wherein each of the one or more shared keys is associated with a respective distance, a respective AoA, or a respective zone.

9. The apparatus of claim 8, wherein to configure the key from the set of shared keys, the at least one processor coupled to the memory is further configured to:
   determine the key from the set of shared keys based on the configuration and the at least one of the received configuration, the location of the second UE, the AoA of the received at least one message or signal, or the location of the first UE.

10. The apparatus of claim 8, wherein each of the one or more shared keys is associated with a different UE.

11. The apparatus of claim 1, further comprising a transceiver coupled to the at least one processor.

12. A method for wireless communication at a first user equipment UE, comprising:
   receiving, from a wireless device, a configuration for a set of shared keys;
   receiving, from a second UE, at least one message or signal including a location of the second UE, the received at least one message or signal being associated with an angle of arrival (AoA);
   configuring a key from the set of shared keys based on at least one of the received configuration, the location of the second UE, the AoA of the received at least one message or signal, or a location of the first UE; and
   generating one or more ranging signals based on the configured key, the one or more ranging signals being directionally secure based on the location of the second UE.

13. The method of claim 12, further comprising:
   transmitting, to the second UE, a public service message (PSM) including the location of the first UE, wherein the transmitted PSM is associated with the AoA.

14. The method of claim 12, wherein the wireless device is a road-side unit (RSU).

15. The method of claim 12, wherein the location of the first UE is an absolute location or a relative location, and the location of the second UE is an absolute location or a relative location.

16. The method of claim 12, wherein the at least one message is a public service message (PSM) or a road safety message (RSM).

* * * * *